(12) United States Patent
Chang et al.

(10) Patent No.: US 12,338,328 B2
(45) Date of Patent: Jun. 24, 2025

(54) REVERSIBLE STRESS-RESPONSIVE MATERIAL, PREPARATION METHOD, AND USE THEREOF

(71) Applicants: Southwest University of Science and Technology, Mianyang (CN); Sichuan Guanmusi Yang New Material Technology Co LTD, Mianyang (CN)

(72) Inventors: Guanjun Chang, Mianyang (CN); Li Yang, Mianyang (CN); Yewei Xu, Mianyang (CN); Ying Huang, Mianyang (CN); Rui Yuan, Mianyang (CN); Mengqi Du, Mianyang (CN)

(73) Assignees: Southwest University of Science and Technology, Mianyang (CN); Sichuan Guanmusi Yang New Material Technology Co LTD, Mianyang (CN)

( * ) Notice: Subject to any disclaimer, the term of this patent is extended or adjusted under 35 U.S.C. 154(b) by 554 days.

(21) Appl. No.: 17/891,160

(22) Filed: Aug. 19, 2022

(65) Prior Publication Data
US 2023/0391963 A1    Dec. 7, 2023

(30) Foreign Application Priority Data

Jun. 2, 2022 (CN) .......................... 202210623223.8
Jun. 14, 2022 (CN) .......................... 202210669588.4

(51) Int. Cl.
C08F 267/06 (2006.01)
C08G 81/02 (2006.01)

(52) U.S. Cl.
CPC .......... *C08G 81/024* (2013.01); *C08F 267/06* (2013.01)

(58) Field of Classification Search
CPC ........ C08G 81/024; C08F 267/06; C08F 8/34; C08F 220/14; C08J 3/24; C08J 2333/08; C08K 5/3472
See application file for complete search history.

(56) References Cited

U.S. PATENT DOCUMENTS

2022/0220242 A1* 7/2022 Smith ................... C08F 283/12

OTHER PUBLICATIONS

Feng (K. Feng et al, Synthesis and evaluation of acrylate resins suspending indole derivative structure in the side chain for marine antifouling, Colloids and Surfaces B: Biointerfaces 184 (2019) 110518).*

* cited by examiner

*Primary Examiner* — Kumar R Bhushan
(74) *Attorney, Agent, or Firm* — Birchwood IP (57) ABSTRACT

A reversible stress-responsive material, a preparation method, and a use thereof are provided. The reversible stress-responsive material has the property of real-time reversible force response at room temperature. When used with crosslinked plastic (high Tg) and rubber (low Tg) polymer materials, the reversible stress-responsive material can significantly enhance the mechanical strength and ductility of covalently cross-linked polymers. the triazolinedione (TAD)-indole click chemistry with the force-induced reversible property is used to construct a force-reversible crosslinked polymer material, and such a force-induced reversible crosslinking method can achieve the breakage and re-forming of covalent crosslinking points at room temperature in a solid state without any external stimuli other than the ambient temperature. This room-temperature force-induced reversible C—N covalent crosslinking can be regarded as an innovative approach to designing a high-toughness polymer material.

19 Claims, 6 Drawing Sheets

REVERSIBLE STRESS-RESPONSIVE MATERIAL, PREPARATION METHOD, AND USE THEREOF

CROSS REFERENCE TO THE RELATED APPLICATIONS

This application is based upon and claims priority to Chinese Patent Applications No. 202210669588.4, filed on Jun. 14, 2022, and No. 202210623223.8, filed on Jun. 2, 2022, the entire contents of which are incorporated herein by reference.

TECHNICAL FIELD

The present disclosure belongs to the technical field of special materials and, in particular, relates to a reversible stress-responsive material, a preparation method, and a use thereof.

BACKGROUND

Polymer materials prepared by covalent crosslinking have been widely used in many fields and areas of daily life due to their excellent mechanical strength and thermal stability. Most polymer materials prepared by covalent crosslinking are used at room temperature, and the integrity of a covalent polymer network directly affects the performance and lifetime of the polymer materials. However, crosslinked polymers inevitably undergo long-term external disturbance, which usually causes irreversible cleavage of covalent bonds, thereby resulting in the chemical destruction of a crosslinked network. Such a phenomenon seriously weakens the mechanical and functional performance of the polymer materials prepared by covalent crosslinking, shortens the service life of the polymer materials, and even brings safety risks to the use of the polymer materials.

Generally, weak covalent bonds preferentially break in response to the energy of an external disturbance. Currently, a series of weak force-responsive covalent bonds are introduced as crosslinking points into a covalent polymer network to improve both the mechanical strength and the ductility of a polymer material. Although weak force-responsive covalent bonds can be re-formed through external stimuli, such as ultraviolet (UV) or visible light irradiation, heating, or catalysis, broken bonds cannot be re-formed in real-time at room temperature, such that a polymer network will be irreversibly damaged during long-term use. In addition, organic free radicals resulting from homolytic cleavage show prominent dissociation and remodeling abilities. However, free radicals are prone to irreversibly react with surrounding molecules, such as oxygen molecules, water molecules, etc., especially when exposed to environmental conditions for a long time, such that the free radicals will lose their activities.

SUMMARY

In view of the above-mentioned defects in the prior art, the present disclosure provides a reversible stress-responsive material, a preparation method, and a use thereof.

In order to achieve the above objective, the present disclosure adopts the following technical solutions. A reversible stress-responsive material and a method of preparing the reversible stress-responsive material are provided. The preparation method of a reversible stress-responsive material includes the following steps:

S1: synthesizing N-(1H-2-phenyl-indole-3-methyl)acrylamide (NPI) and N-(1H-indole-3-methyl)acrylamide (NIAM) and, taking at least one of the NPI and the NIAM as an indolyl structural unit;

S2: co-dissolving a linear polymer raw material, the indolyl structural unit(s), and an initiator azobisisobutyronitrile (AIBN) in an organic solvent and heating the resulting mixture to 70° C. to 80° C. in a protective gas atmosphere to allow a reaction for 0.5 h to 1 h to obtain a prepolymer solution, where the linear polymer raw material is at least one material selected from the group consisting of polymethyl acrylate (PMA), polymethyl methacrylate (PMMA), epoxy resin, polyurethane (PU), polysiloxane, polyaryletherketone (PAEK), polyarylethersulfone (PAES), and polyimide (PI);

S3: adding azobisisoheptanenitrile (ABVN) to the prepolymer solution, allowing a reaction to occur at 50° C. to 60° C. for 20 h to 25 h, heating the resulting reaction system at 110° C. to 130° C. for 2 h, and drying the reaction product for 12 h to 15 h at 75° C. to 85° C. and 0.05 MPa to 0.1 MPa to obtain an indolyl side chain-containing linear polymer; and S4: dissolving the indolyl side chain-containing linear polymer in an organic solvent, adjusting the temperature of a resulting solution to 15° C. to 20° C. and adding 4,4'-(4,4'-diphenylmethylene)-bis-(1,2,4-triazoline-3,5-dione) (MDI-TAD) under stirring; and pouring the resulting polymer solution onto a glass plate and conducting evaporation in a vacuum environment at 75° C. to 85° C. for 10 h to 15 h.

The following improvements can be further made by the present disclosure based on the above technical solution.

Further, the NPI may be synthesized through the following steps:

co-dissolving 2-phenylindole and N-methylolacrylamide in an organic solvent at a molar ratio of 1:(1-1.5), adding aluminum chloride under stirring and allowing a reaction in an ice bath for 2 h; raising the temperature to room temperature and further allowing a reaction to occur at room temperature for 45 h to 50 h; adding dilute sulfuric acid and conducting extraction with dichloromethane (DCM); and collecting a resulting organic phase and conducting concentration and purification, where a molar ratio of the aluminum chloride to the 2-phenylindole is 1:10; and a molar ratio of the dilute sulfuric acid to the aluminum chloride is 3:2.

Further, the NIAM may be synthesized through the following steps:

co-dissolving indole and N-methylolacrylamide in an organic solvent at a molar ratio of 5:(5-10), adding aluminum chloride under stirring, and allowing a reaction at 25° C. to 30° C. for 2 d to 3 d; and adding dilute sulfuric acid and conducting suction filtration and purification, where a molar ratio of the aluminum chloride to the indole is 3:5; and a molar ratio of the dilute sulfuric acid to the aluminum chloride is 3:2.

Further, a molar ratio of the linear polymer raw material to the indolyl structural unit may be 20:(0.5-2); and a molar ratio of the indolyl side chain-containing linear polymer to the MDI-TAD may be (0.5-2):(0.1-1).

Further, the linear polymer raw material may be PMA, the indolyl structural unit may be NPI, the PMA and the NPI may be in a molar ratio of 20:1, and the indolyl side chain-containing linear polymer and the MDI-TAD may be in a molar ratio of 1:0.5. Alternatively, the linear polymer raw material may be PMA, the indolyl structural unit may be NIAM, the PMA and the NIAM may be in a molar ratio of 20:1, and the indolyl side chain-containing linear polymer and the MDI-TAD may be in a molar ratio of 1:0.5. Alternatively, the linear polymer raw material may be PMA, the indolyl structural unit may be a mixture of NPI and NIAM, the PMA, the NPI, and the NIAM may be in a molar ratio of 20:0.5:0.5, and the indolyl side chain-containing linear polymer and the MDI-TAD may be in a molar ratio of 0.5:0.5. Alternatively, the linear polymer raw material may be PMMA, the indolyl structural unit may be NPI, the PMMA and the NPI may be in a molar ratio of 20:1, and the indolyl side chain-containing linear polymer and the MDI-TAD may be in a molar ratio of 1:0.5.

Further, a mass of the AIBN may be 0.01% to 0.02% of a total mass of the linear polymer raw material and the indolyl structural unit; and a mass of the ABVN may be 0.05% to of the total mass of the linear polymer raw material and the indolyl structural unit.

Further, the organic solvent in S2 may be N,N-dimethylformamide (DMF); and the organic solvent in S4 may be 1,4-dioxane or DMF.

Further, the MDI-TAD may be prepared through the following steps:
  S1: dissolving each of ethyl carbazate and 4,4'-methylenebis(phenyl isocyanate) in an organic solvent to obtain two solutions, mixing the two solutions in a protective gas atmosphere, and stirring the resulting mixed solution at room temperature to allow a reaction to occur for 1 h to 3 h; and heating to 85° C. to 95° C., further stirring to allow a reaction to occur for 1 h to 3 h, and conducting filtration and wash to obtain a bifunctional semicarbazide;
  S2: dissolving the bifunctional semicarbazide in an alkali liquor, heating to reflux at 90° C. to 120° C. for 1 h to 3 h, and acidifying and filtering to obtain bifunctional urazole; and
  S3: co-dissolving the bifunctional urazole and DABCO-Br in an organic solvent, stirring the resulting solution at room temperature to allow a reaction to occur for 1 h to 3 h, and conducting filtration and vacuum concentration to obtain the MDI-TAD.

The DABCO-Br may be prepared through the following steps: dissolving each of triethylenediamine (TEDA) and $Br_2$ in an organic solvent to obtain two solutions, mixing the two solutions in a protective gas atmosphere, stirring the resulting mixed solution at room temperature to allow a reaction to occur for 1 h to 3 h, and conducting filtration, wash, and drying to obtain the DABCO-Br.

The present disclosure also discloses the use of the reversible stress-responsive material described above in the preparation of a high-toughness polymer.

Beneficial effects of the present disclosure: The reversible stress-responsive material prepared by the present disclosure has the property of real-time reversible force response at room temperature. When used with crosslinked plastic (high Tg) and rubber (low Tg) polymer materials, the reversible stress-responsive material can significantly enhance the mechanical strength and ductility of covalently cross-linked polymers. In the present disclosure, the triazolinedione (TAD)-indole click chemistry with the force-induced reversible property is used to construct a high-toughness cross-linked polymer material, and such a force-induced reversible crosslinking method can achieve the breakage and re-forming of covalent crosslinking points at room temperature in a solid state without any external stimuli other than the room temperature. This room-temperature force-induced reversible C—N covalent crosslinking can be regarded as an innovative approach to design a high-toughness polymer material.

BRIEF DESCRIPTION OF THE DRAWINGS

FIGS. 2A-2B show $^1$H-nuclear magnetic resonance ($^1$H-NMR) spectra of CPMA, where

FIGS. 3A-3B show $^1$H-NMR spectra of CPMMA, where

DETAILED DESCRIPTION OF THE EMBODIMENTS

The specific implementations of the present disclosure will be described in detail below in conjunction with examples.

Figure 1:
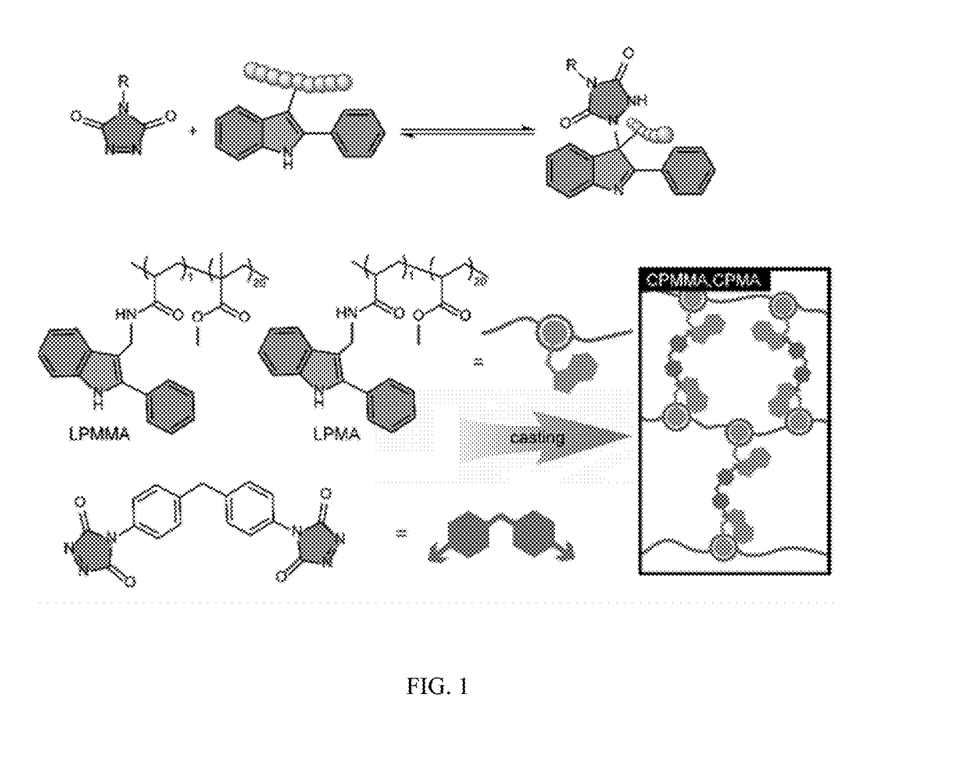
FIG. 1 is a synthesis flow chart of a reversible stress-responsive material.

A preparation route of the reversible stress-responsive material in the present disclosure is shown in FIG. 1.

EXAMPLE 1

A reversible stress-responsive material was prepared through the following steps:
(1) Synthesis of NPI (1-1)

A synthetic route of NPI is shown in formula (1-1). A specific process was as follows:

2-phenylindole (19.32 g, 0.1 mol) and N-methylolacrylamide (12.13 g, 0.12 mol) were co-dissolved in DCM (200 mL) to obtain a mixed solution, and anhydrous aluminum chloride (1.34 g, 10 mmol) was dissolved in DCM (20 mL) to obtain a suspension. The suspension with aluminum chloride was added to the mixed solution of 2-phenylindole and N-methylolacrylamide in an ice bath under stirring, and the resulting mixture was stirred in the ice bath for 2 h, then gradually warmed to room temperature, and further stirred to allow a reaction for 48 h at room temperature. An iced dilute sulfuric acid solution (a molar ratio of sulfuric acid to aluminum chloride was 3:2) was added to the resulting reaction mixture, and extraction was conducted multiple times with DCM. The resulting organic phase was collected, washed with deionized water, dried over $Na_2SO_4$, and subjected to vacuum concentration to obtain a crude product. The crude product was purified by silica gel column chromatography with petroleum ether/ethyl acetate=2:1 ($R_f$=0.75, TLC eluent: petroleum ether:ethyl acetate=1:2) to obtain NPI (yield: 73%). Spectral data of NPI was as follows:

$^1$H-NMR (600 MHz, DMSO-$d_6$): δ=11. 373 (s, NH), 8.412 (s, NH), 7.701 (s, ArH), 7.598 (s, ArH), 7.529 (t, ArH), 7.404 (m ArH), 7.137 (t, ArH), 7.031 (t, ArH), 6.291 (m, CH), 6.178 (d, $CH_2$), 5.591 (d, $CH_2$), 4.509 (d, $CH_2$). $^{13}$CNMR (125 MHz, DMSO-$d_6$): δ (ppm)=164.853 (C), 136.414 (C), 132.634 (C), 132.223 (CH), 129.249 (C), 128.830 (CH), 128.600 (CH), 128.228 ($CH_2$), 125.601 (C), 122.321 (CH), 119.596 (CH), 119.416 (CH), 111.703 (C), 108.761 (CH), 33.944 ($CH_2$). HRMS (m/z): calculated: 277.1331 [MH]$^+$, and found: 277.1296 [MH]$^+$.

(2) Preparation of MDI-TAD 1 eq) in 200 mL of toluene was filled. The three-necked flask was connected with a mechanical stirrer and a condenser; air in the three-necked flask was replaced with nitrogen, and then the 4,4'-methylenebis(phenyl isocyanate) solution was slowly added under vigorous stirring. After the addition was completed, the resulting mixture was stirred at room temperature to allow a reaction to occur for 2 h, then heated to 90° C., further stirred to allow a reaction for 2 h, and then cooled to room temperature, and the resulting product was filtered out and washed with toluene to obtain bifunctional semicarbazide.

The bifunctional semicarbazide (86.2 g, 0.188 mol) was dissolved in 330 mL of a potassium hydroxide aqueous solution (4 M) in a 1 L flask under an inert atmosphere and then heated to reflux at 100° C. for 1.5 h. The pH was adjusted to 1 with hydrogen chloride, and the resulting product was filtered out to obtain bifunctional urazole (a white solid powder).

The bifunctional urazole (2 g, 5.46 mmol, 1 eq), DABCO-Br (5 g, 3.18 mmol, 0.58 eq), and DCM (30 mL) were added together to a 100 mL flask, and the resulting mixture was stirred at room temperature to allow a reaction to occur for 2 h. The resulting mixture was filtered to obtain a filter cake and a filtrate. The filter cake was washed with DCM (2×30 mL), and the filtrate was subjected to vacuum concentration to obtain MDI-TAD.

Preparation of DABCO-Br: TEDA (6.73 g, 60.0 mmol, 1 eq) was dissolved in chloroform (100 mL) in a 500 mL two-neck flask, and then a solution of $Br_2$ (20.0 g, 0.125 mol, 2.1 eq) in chloroform (100 mL) was added dropwise through a feed funnel. After the addition was completed, the resulting mixture was stirred in an inert atmosphere to allow (1-2)

A synthetic route of MDI-TAD was shown in formula (1-2). A specific process was as follows:

A mixture of ethyl carbazate (40.0 g, 0.384 mol, 2 eq) and toluene (300 mL) was placed in a 1 L three-necked flask and cooled in an ice bath. The three-necked flask was equipped with a feed funnel in which a solution obtained by dissolving 48.0 g of 4,4'-methylenebis(phenyl isocyanate) (0.192 mol, a reaction to occur for 1 h, and then a yellow precipitate was filtered out, washed with chloroform (50 mL), and dried overnight in a vacuum oven at 40° C. to obtain DABCO-Br.

(3) Methyl acrylate (MA) (100 mmol), NPI (5 mmol), AIBN (with a mass 0.015% of a total mass of MA and NPI), and DMF (3 mL) were added to a double-necked flask equipped with a magnetic stirrer and a nitrogen outlet and inlet, and the double-necked flask was purged with high-purity nitrogen. The resulting reaction mixture was heated to 75° C. in a nitrogen atmosphere and stirred to allow a reaction to occur for 0.5 h to obtain a prepolymer solution. ABVN (with a mass 0.1 wt % of a total mass of MA and NPI) was added to the prepolymer solution, and the resulting mixture was heated at 55° C. to allow a reaction to occur for 24 h. The reaction product was heated at 120° C. for 2 h and then dried in a vacuum dryer at 80° C. and 0.09 MPa for 12 h to obtain LPMA.

(4) MDI-TAD (2.5 mmol) was dissolved in 1,4-dioxane, and the resulting MDI-TAD solution was cooled in a refrigerator. LPMA was dissolved in 30 mL of 1,4-dioxane at 80° C., and then a resulting polymer solution was cooled in a refrigerator to about 15° C., which would reduce the crosslinking speed during mixing. The polymer solution was placed in a stirrer with a high stirring speed (1,000 rpm), the MDI-TAD solution was added to the polymer solution, and the resulting mixture was stirred for 20 s. The resulting mixed solution was poured onto a silicone rubber sheet, and the resulting product was subjected to evaporation in a vacuum box at 80° C. for 12 h to obtain the reversible stress-responsive material (CPMA, with a thickness of about 0.2 mm).

Figure 2A:
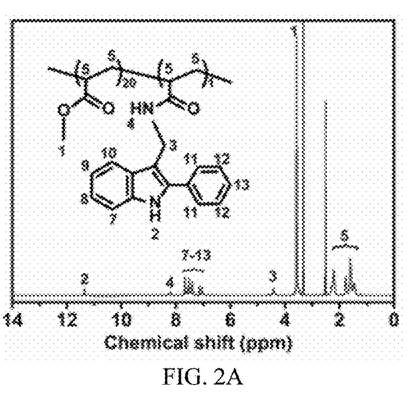
FIG. 2A shows a spectrum of CPMA in DMSO-$d_6$ and FIG. 2B shows a partial enlarged view in a range of 7.8 ppm to 6.8 ppm.
Figure 2B:
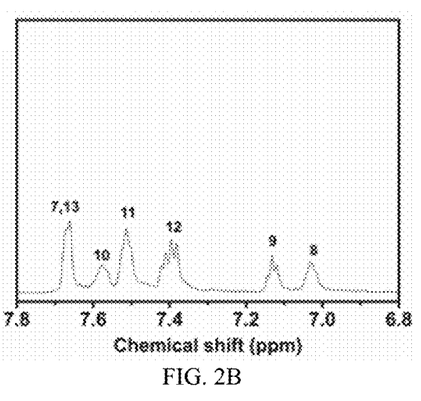

$^1$H-NMR spectra of CPMA are shown FIGS. 2A-2B, where FIG. 2A shows a spectrum of CPMA in DMSO-$d_6$ and FIG. 2B shows a partial enlarged view in a range of 7.8 ppm to 6.8 ppm.

EXAMPLE 2

A reversible stress-responsive material was prepared through the following steps:
(1) Synthesis of NPI
The synthesis process of NPI was the same as in Example 1.
(2) Preparation of MDI-TAD
The synthesis process of MDI-TAD was the same as in Example 1.
(3) Methyl methacrylate (MMA) (87.8 mmol), NPI (4.4 mmol), AIBN (with a mass 0.01% of a total mass of MMA and NPI), and DMF (3 mL) were added to a double-necked flask equipped with a magnetic stirrer and a nitrogen outlet and inlet, and the double-necked flask was purged with high-purity nitrogen. The resulting reaction mixture was heated to 80° C. in a nitrogen atmosphere and stirred to allow a reaction to occur for 0.5 h to obtain a prepolymer solution. ABVN (with a mass 0.05 wt % of a total mass of MMA and NPI) was added to the prepolymer solution, and the resulting mixture was heated at 60° C. to allow a reaction to occur for 20 h. The reaction product was heated at 120° C. for 2 h and then dried in a vacuum dryer at 75° C. and 0.1 MPa for 15 h to obtain LPMMA.
(4) MDI-TAD (2.2 mmol) was dissolved in DMF, and the resulting MDI-TAD solution was cooled in a refrigerator. LPMMA was dissolved in 30 mL of DMF at 80° C., and then a resulting polymer solution was cooled in a refrigerator to about 15° C., which would reduce the crosslinking speed during mixing. The polymer solution was placed in a stirrer with a high stirring speed (1,000 rpm), the MDI-TAD solution was added to the polymer solution, and a resulting mixture was stirred for 20 s. The resulting mixed solution was poured onto a silicone rubber sheet, and the resulting product was subjected to evaporation in a vacuum box at 80° C. for 12 h to obtain the reversible stress-responsive material (CPMMA, with a thickness of about 0.2 mm).

Figure 3A:
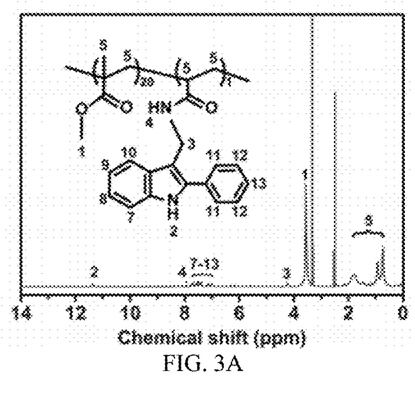
FIG. 3A shows a spectrum of CPMMA in DMSO-$d_6$ and FIG. 3B shows a partial enlarged view in a range of 7.8 ppm to 6.8 ppm.
Figure 3B:
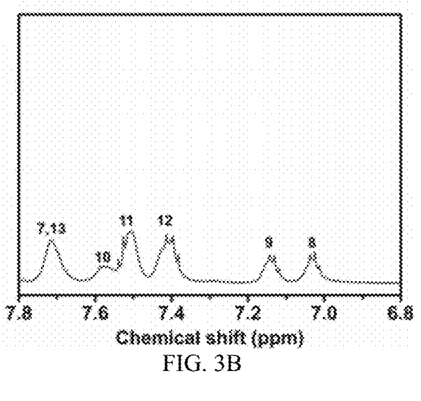
Figure 4A:
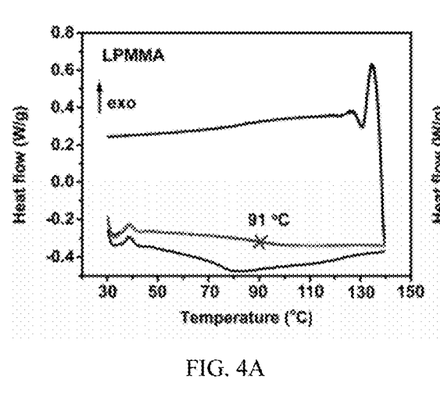
FIGS. 4A-4D show differential scanning calorimetry (DSC) analysis results of LPMMA, CPMMA, LPMA, and CPMA films.
Figure 4B:
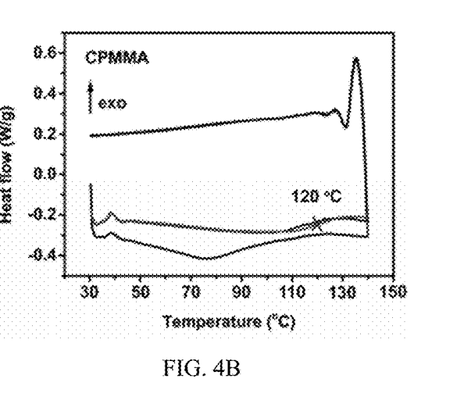
Figure 4C:
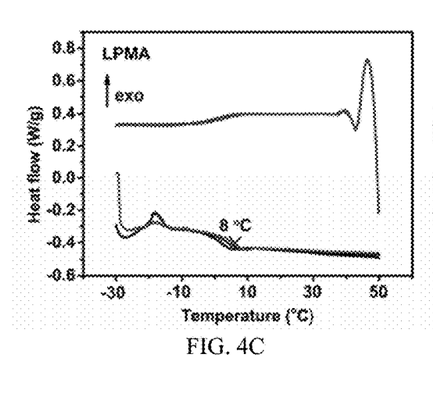
Figure 4D:
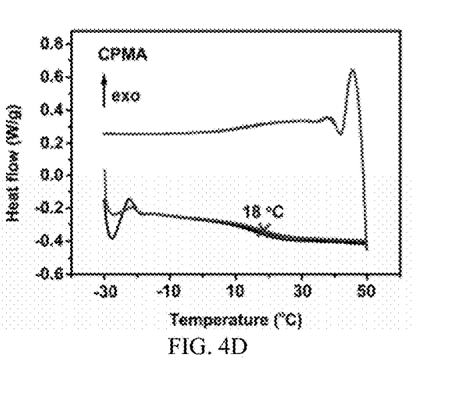

$^1$H-NMR spectra of CPMMA are shown FIGS. 3A-3B, where FIG. 3A shows a spectrum of CPMMA in DMSO-$d_6$ and FIG. 3B shows a partial enlarged view in a range of 7.8 ppm to 6.8 ppm.

EXAMPLE 3

A reversible stress-responsive material was prepared through the following steps:
(1) Synthesis of NIAM A synthetic route of NIAM is shown in formula (1-3). A specific process was as follows:

Indole (5.85 g, 0.05 mol), N-methylolacrylamide (7.2 g, 0.07 mol), and absolute ethanol (100 mL) were sequentially added to a 250 cm³ conical flask. After the N-methylolacrylamide was completely dissolved, anhydrous aluminum trichloride (4.0 g) was slowly added; then a resulting mixture was stirred in a water bath at 25° C. for 3 d, during which the system gradually changed from colorless to red. After the reaction was completed, most of the ethanol was removed through rotary evaporation, then a dilute sulfuric acid solution (a molar ratio of sulfuric acid to aluminum trichloride was 3:2) was added to the concentrated solution, and the resulting mixture was stirred to remove the catalyst aluminum trichloride. The resulting system was subjected to suction filtration, a resulting filter cake was dried to obtain a brick-red crude product, and the crude product was purified through column chromatography with petroleum ether/ethyl acetate=2:1 as an eluent ($R_f$=0.45, TLC eluent: petroleum ether:ethyl acetate=1:2) to obtain pure NIAM (yield: 65.5%). Spectral data of NIAM was as follows:

$^1$H-NMR (600 MHz, DMSO-$d_6$: δ=10.930 (s, NH), 8.331 (s, NH), 7.549 (d, ArH), 7.367 (d, ArH), 7.272 (d, ArH), 7.082 (d, ArH), 6.984 (d, ArH), 6.249 (m, —CH=CH$_2$), 6.139 (m, —CH=CH$_2$), 5.572 (d, —CH=CH$_2$), 4.486 (d, Ar—CH$_2$—). $^{13}$CNMR (125 MHz, DMSO-$d_6$: δ (ppm)=164.648 (C), 136.497 (C), 132.719 (CH), 126.705 (C), 125.198 (C), 124.069 (CH), 122.020 (CH), 119.139 (CH), 119.002 (CH), 112.564 (C), 111.717 (CH), 34.539 (CH$_2$). HRMS (m/z): calculated: 201.1024 [MH]$^+$, and found: 201.0983 [MH]$^+$.

(2) Preparation of MDI-TAD
The synthesis process of MDI-TAD was the same as in Example 1.
(3) MA (104.2 mmol), NIAM (5.21 mmol), AIBN (with a mass 0.02% of a total mass of MA and NPI), and DMF (3 mL) were added to a double-necked flask equipped with a magnetic stirrer and a nitrogen outlet and inlet, and the double-necked flask was purged with high-purity nitrogen; the resulting reaction mixture was heated to 80° C. in a nitrogen atmosphere and stirred to allow a reaction to occur for 1 h to obtain a prepolymer solution. ABVN (with a mass 0.2 wt % of a total mass of MA and NPI) was added to the prepolymer solution, and the resulting mixture was heated at 50° C. to allow a reaction to occur for 25 h, and the reaction product was heated at 130° C. for 2 h and then dried in a vacuum dryer at 85° C. and 0.05 MPa for 15 h to obtain LPMA.

(4) MDI-TAD (2.6 mmol) was dissolved in 1,4-dioxane, and the resulting MDI-TAD solution was cooled in a refrigerator. LPMA was dissolved in 30 mL of 1,4-dioxane at 80° C., and the resulting polymer solution was cooled in a refrigerator to about 15° C., which would reduce the crosslinking speed during mixing; the polymer solution was placed in a stirrer with a high stirring speed (1,000 rpm). The MDI-TAD solution was added to the polymer solution, and the resulting mixture was stirred for 20 s, and the resulting mixed solution was poured onto a silicone rubber sheet. The resulting product was subjected to evaporation in a vacuum box at 85° C. for 10 h to obtain the reversible stress-responsive material (ir-CPMA, with a thickness of about 0.2 mm).

EXAMPLE 4

A reversible stress-responsive material was prepared through the following steps:

(1) Synthesis of NPI and NIAM

The synthesis process of NPI was the same as in Example 1, and the synthesis process of NIAM was the same as in Example 3.

(2) Preparation of MDI-TAD

The synthesis process of MDI-TAD was the same as in Example 1.

(3) MA (102 mmol), NPI (2.55 mmol), NIAM (2.55 mmol), AIBN (with a mass 0.015% of a total mass of MA, NPI, and NIAM), and DMF (3 mL) were added to a double-necked flask equipped with a magnetic stirrer and a nitrogen outlet and inlet, and the double-necked flask was purged with high-purity nitrogen; the resulting reaction mixture was heated to 80° C. in a nitrogen atmosphere and stirred to allow a reaction for 1 h to obtain a prepolymer solution. ABVN (with a mass 0.1 wt % of a total mass of MA, NPI, and NIAM) was added to the prepolymer solution, and the resulting mixture was heated at 60° C. to allow a reaction for 20 h. The reaction product was heated at 110° C. for 2 h and then dried in a vacuum dryer at 75° C. and 0.1 MPa for 12 h to obtain LPMA.

(4) MDI-TAD (2.55 mmol) was dissolved in 1,4-dioxane, and the resulting MDI-TAD solution was cooled in a refrigerator. LPMA was dissolved in 30 mL of 1,4-dioxane at 80° C., and then the resulting polymer solution was cooled in a refrigerator to about 15° C., which would reduce the crosslinking speed during mixing. The polymer solution was placed in a stirrer with a high stirring speed (1,000 rpm), the MDI-TAD solution was added to the polymer solution, and the resulting mixture was stirred for 20 s. The resulting mixed solution was poured onto a silicone rubber sheet, and the resulting product was subjected to evaporation in a vacuum box at for 15 h to obtain the reversible stress-responsive material (du-CPMA, with a thickness of about 0.2 mm).

Result Analysis

The LPMA and CPMA prepared in Example 1, LPMMA and CPMMA prepared in Example 2, ir-CPMA prepared in Example 3, and du-CPMA prepared in Example 4 were observed for transparency and dissolved with different solvents at different temperatures (room temperature and 120° C.), and observation results are shown in Table 1.

TABLE 1

Transparency and solubility properties of reversible stress-responsive materials

| | $DMA^a$ | DMSO | $DMF^b$ | $NMP^c$ | $THF^d$ | Transparency | Soluble fraction (wt %) |
|---|---|---|---|---|---|---|---|
| LPMA | $++^e$ | ++ | ++ | ++ | ++ | Pale yellow, translucent | 100 |
| LPMMA | ++ | ++ | ++ | ++ | ++ | Pale yellow, translucent | 100 |
| CPMA | +− | +− | +− | +− | −− | Yellow, translucent | 0.86 |
| ir-CPMA | −− | −− | −− | −− | −− | Yellow, translucent | 0.64 |
| du-CPMA | −− | −− | −− | −− | −− | Pale yellow, translucent | 0.68 |
| CPMMA | +− | +− | +− | +− | −− | Yellow, translucent | 0.32 |

Notes:
$^e$++ indicates that a polymer can be completely dissolved at room temperature;
+− indicates that a polymer can only be dissolved at 120° C.; and
−− indicates that a polymer is insoluble at a high temperature and room temperature.

It can be seen from Table 1 that the reversible stress-responsive material prepared by the present disclosure is a translucent and non-viscous insoluble solid at room temperature. Linear polymers (LPMMA and LPMA) are completely soluble in different polar solvents. Polymers of different crosslinking types (CPMA, CPMMA, ir-CPMA, and du-CPMA) all exhibited extremely-low dissolved mass percentages (<5 wt % can indicate that a polymer is insoluble) and cannot be dissolved even after being soaked for as long as 7 d, indicating that the introduction of MDI-TAD makes the original indolyl side chain-containing linear polymer crosslinked into a network structure. In addition, the above materials were subjected to DSC analysis, and the results are shown in FIGS. 4A-4D. It can be seen from the figure that CPMMA can be regarded as a typical hard thermosetting material ($T_g$=120° C.) and CPMA can be regarded as a soft material ($T_g$=18° C.). The introduction of MDI-TAD makes the original linear polymer chains combine through various crosslinking points, which restricts the movement of polymer chain segments and increases a cleavage temperature of the polymer chain segments.

Figure 5:
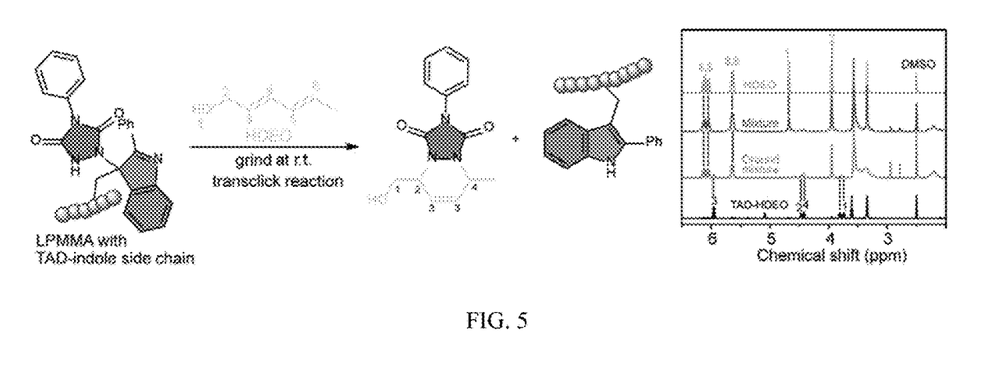
FIG. 5 shows the $^1$H-NMR characterization of material force-induced reversible cleavage of a C—N bond.
Figure 6A:
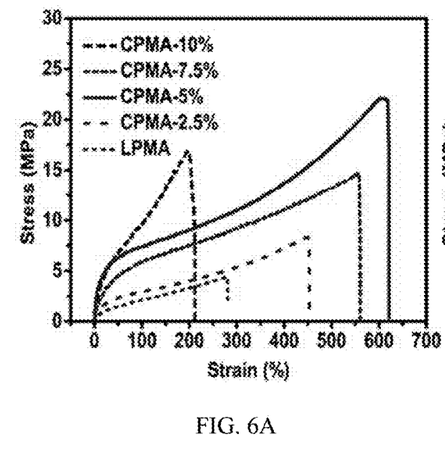
FIGS. 6A-6B show stress-strain curves of materials with different crosslinking densities.
Figure 6B:
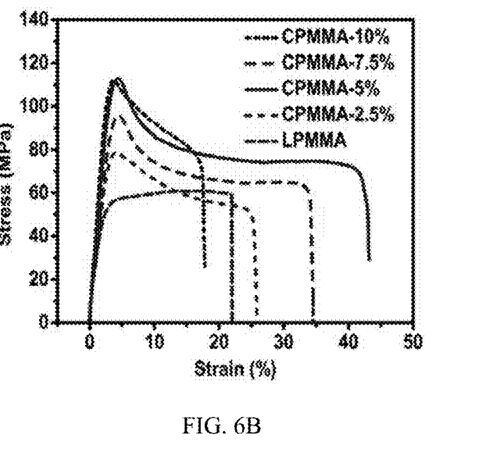
Figure 7A:
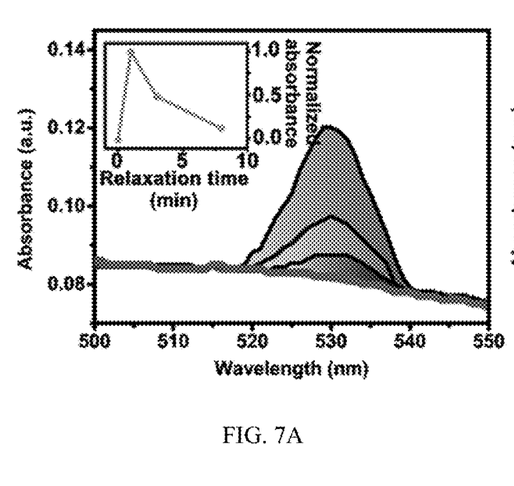
FIGS. 7A-7B and FIGS. 8A-8B show in-situ relaxation-fluorescence and UV absorption spectra of materials.
Figure 7B:
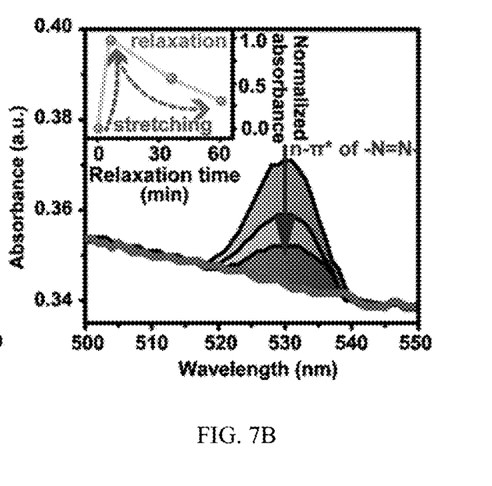

The material force-induced reversible cleavage of a C—N bond was characterized by $^1$H-NMR, and results are shown in FIG. 5. It can be seen from the figure that the C—N bond is cleaved and a new product is generated after grinding. According to the screening results of crosslinking densities, it can be known that the PMA and PMMA materials have the optimal mechanical performance when a crosslinking density is 5% (FIGS. 6A-6B). The CPMA-5% and CPMMA-5% were subjected to in-situ relaxation-fluorescence and UV absorption spectroscopy, and results are shown in FIGS.

Figure 8A:
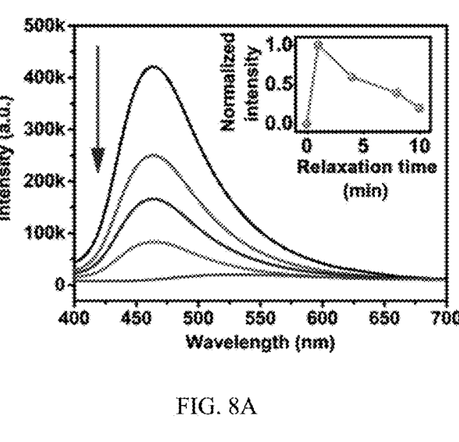
Figure 8B:
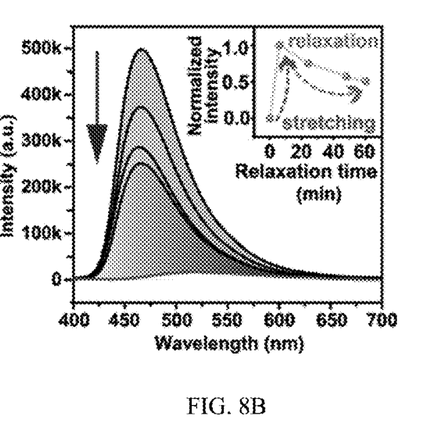
Figure 9:
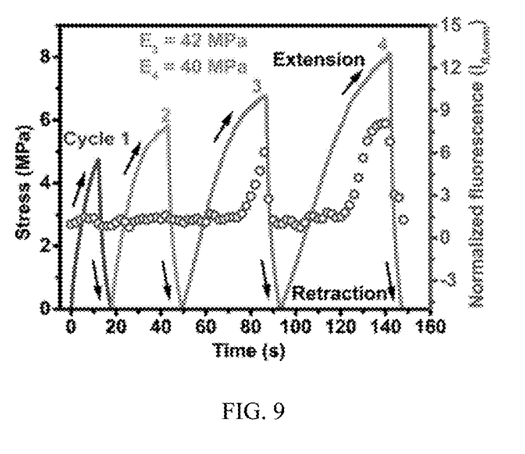
FIG. 9 shows an in-situ stretching-fluorescence spectrum of a material.
Figure 10:
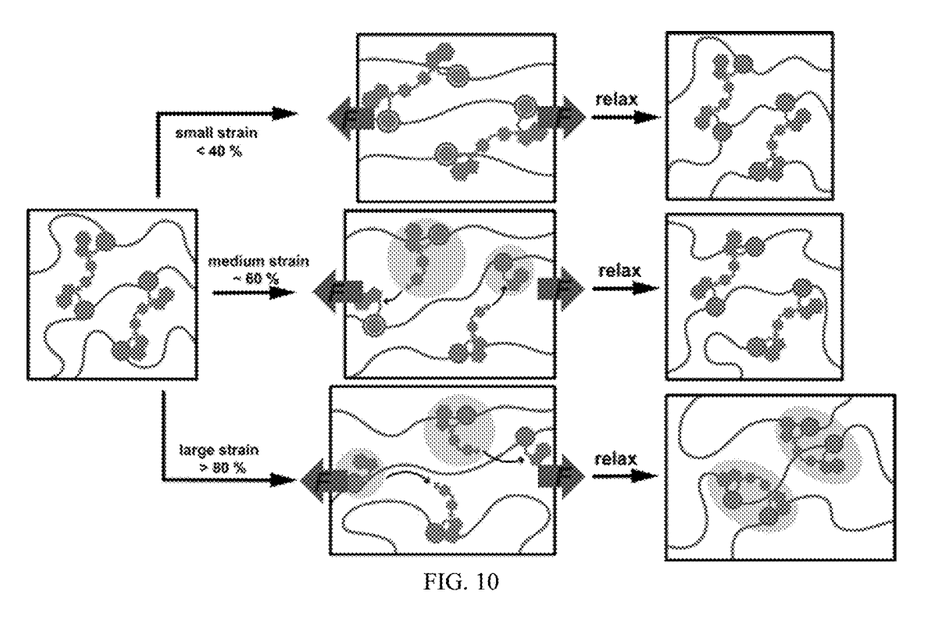
FIG. 10 shows the breakage and re-forming behaviors of a C—N bond of a material under different tensile strains.
Figure 11:
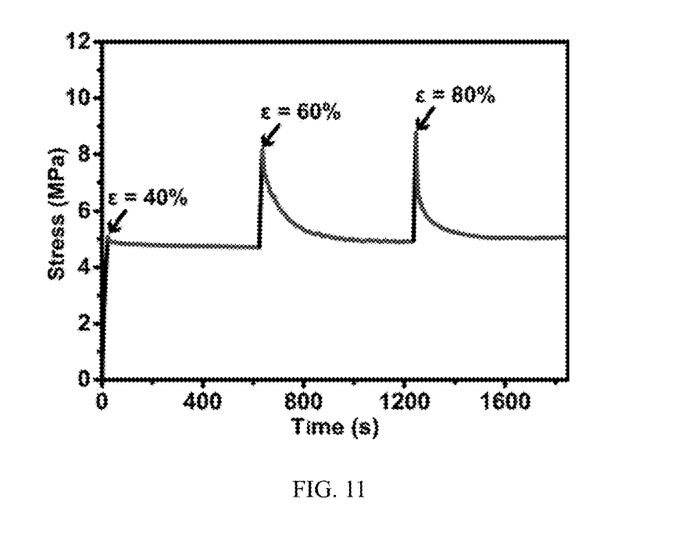
FIG. 11 shows the repeated relaxation test results of a force-induced reversible C—N crosslinked polymer material.

7A-7B and FIGS. 8A-8B. The results show that the breakage and re-forming of the reversible C—N bond under a tensile force leads to a change in UV and fluorescence intensity. To determine the kinetics of force-induced reversible C—N crosslinked polymers, both films were subjected to in-situ stretching-fluorescence spectroscopy, and results are shown in FIG. 9. The above results reflect the dynamic changes of the materials as shown in FIG. 10. When the strain is less than 40%, the force-induced reversible C—N bond does not break. When the strain is about 60%, the force-induced reversible C—N bond begins to break and is then re-formed in-situ after relaxation. When a strain is greater than 80%, the force-induced reversible C—N bond breaks and is re-formed at a new site. The C—N bond crosslinked polymer material was subjected to repeated relaxation tests, and the results are shown in FIG. 11. When the strain is greater than 60%, the excessive internal stress of the polymer can be completely released, which is attributed to energy dissipation when the force-induced reversible C—N bond constantly breaks and is then re-formed in a crosslinked polymer network.

Although the specific implementations of the present disclosure are described in detail in conjunction with examples, it should not be construed as limiting the protection scope of the present disclosure. Within the scope defined by the claims, all modifications and variations made by those skilled in the art without creative efforts shall fall within the protection scope of the present disclosure.

What is claimed is:

1. A method of preparing a reversible stress-responsive material comprising the following steps:
   S1: synthesizing N-(1H-2-phenyl-indole-3-methyl)acrylamide (NPI) and N-(1H-indole-3-methyl)acrylamide (NIAM), and using at least one of the NPI and the NIAM as an indolyl structural unit;
   S2: co-dissolving a linear polymer raw material, the indolyl structural unit, and azobisisobutyronitrile (AIBN) in a first organic solvent, and heating a resulting mixture to 70° C. to 80° C. in a protective gas atmosphere to allow a first reaction for 0.5 h to 1 h to obtain a prepolymer solution, wherein the linear polymer raw material is at least one selected from the group consisting of polymethyl acrylate (PMA), polymethyl methacrylate (PMMA), epoxy resin, polyurethane (PU), polysiloxane, polyaryletherketone (PAEK), polyarylethersulfone (PAES), and polyimide (PI);
   S3: adding azobisisoheptanenitrile (ABVN) to the prepolymer solution, allowing a second reaction at 50° C. to 60° C. for 20 h to 25 h, heating a resulting reaction system at 110° C. to 130° C. for 2 h, and drying a reaction product for 12 h to 15 h at 75° C. to 85° C. and 0.05 MPa to 0.1 MPa to obtain an indolyl side chain-containing linear polymer; and
   S4: dissolving the indolyl side chain-containing linear polymer in a second organic solvent, adjusting a temperature of a resulting solution to 15° C. to 20° C., and adding 4,4'-(4,4'-diphenylmethylene)-bis-(1,2,4-triazoline-3,5-dione) (MDI-TAD) under stirring; and pouring a resulting polymer solution onto a glass plate, and conducting an evaporation in a vacuum environment at 75° C. to 85° C. for 10 h to 15 h.

2. The method of preparing the reversible stress-responsive material according to claim 1, wherein the NPI is synthesized through the following steps:
   co-dissolving 2-phenylindole and N-methylolacrylamide in a third organic solvent at a molar ratio of 1:(1-1.5), adding aluminum chloride under stirring, and allowing a third reaction in an ice bath for 2 h; raising to a room temperature, and further allowing the reaction at the room temperature for 45 h to 50 h; adding dilute sulfuric acid, and conducting an extraction with dichloromethane (DCM); and collecting a resulting organic phase, and conducting a concentration and a purification, wherein a molar ratio of the aluminum chloride to the 2-phenylindole is 1:10; and a molar ratio of the dilute sulfuric acid to the aluminum chloride is 3:2.

3. The method of preparing the reversible stress-responsive material according to claim 1, wherein the NIAM is synthesized through the following steps:
   co-dissolving indole and N-methylolacrylamide in a third organic solvent at a molar ratio of 5:(5-10), adding aluminum chloride under stirring, and allowing a third reaction at 25° C. to 30° C. for 2 d to 3 d; and adding dilute sulfuric acid, and conducting suction a filtration and a purification, wherein a molar ratio of the aluminum chloride to the indole is 3:5; and a molar ratio of the dilute sulfuric acid to the aluminum chloride is 3:2.

4. The method of preparing the reversible stress-responsive material according to claim 2, wherein a molar ratio of the linear polymer raw material to the indolyl structural unit is 20:(0.5-2); and a molar ratio of the indolyl side chain-containing linear polymer to the MDI-TAD is (0.5-2):(0.1-1).

5. The method of preparing the reversible stress-responsive material according to claim 4, wherein the linear polymer raw material is PMA, the indolyl structural unit is NPI, the PMA and the NPI are in a molar ratio of 20:1, and the indolyl side chain-containing linear polymer and the MDI-TAD are in a molar ratio of 1:0.5; or, the linear polymer raw material is PMA, the indolyl structural unit is NIAM, the PMA and the NIAM are in a molar ratio of 20:1, and the indolyl side chain-containing linear polymer and the MDI-TAD are in a molar ratio of 1:0.5; or, the linear polymer raw material is PMA, the indolyl structural unit is a mixture of NPI and NIAM, the PMA, the NPI, and the NIAM are in a molar ratio of 20:0.5:0.5, and the indolyl side chain-containing linear polymer and the MDI-TAD are in a molar ratio of 0.5:0.5; or, the linear polymer raw material is PMMA, the indolyl structural unit is NPI, the PMMA and the NPI are in a molar ratio of 20:1, and the indolyl side chain-containing linear polymer and the MDI-TAD are in a molar ratio of 1:0.5.

6. The method of preparing the reversible stress-responsive material according to claim 1, wherein a mass of the AIBN is 0.01% to 0.02% of a total mass of the linear polymer raw material and the indolyl structural unit; and a mass of the ABVN is 0.05% to 0.2% of the total mass of the linear polymer raw material and the indolyl structural unit.

7. The method of preparing the reversible stress-responsive material according to claim 1, wherein the first organic solvent in S2 is N,N-dimethylformamide (DMF); and the second organic solvent in S4 is 1,4-dioxane or DMF.

8. The method of preparing the reversible stress-responsive material according to claim 1, wherein the MDI-TAD is prepared through the following steps:
   S1: dissolving each of ethyl carbazate and 4,4'-methylenebis(phenyl isocyanate) in a third organic solvent to obtain an ethyl carbazate solution and a 4,4'-methylenebis(phenyl isocyanate) solution, mixing the ethyl carbazate solution and the 4,4'-methylenebis(phenyl isocyanate) solution in a protective gas atmosphere, and stirring a first resulting mixed solution at a room temperature to allow a third reaction for 1 h to 3 h; and heating to 85° C. to 95° C., further stirring to allow the third reaction for 1 h to 3 h, and conducting a first filtration and a first wash to obtain a bifunctional semicarbazide;

S2: dissolving the bifunctional semicarbazide in an alkali liquor, heating to reflux at 90° C. to 120° C. for 1 h to 3 h, and acidifying and filtering to obtain a bifunctional urazole; and S3: co-dissolving the bifunctional urazole and DABCO-Br in a fourth organic solvent, stirring a second resulting mixed solution at the room temperature to allow a fourth reaction for 1 h to 3 h, and conducting a second filtration and a vacuum concentration to obtain the MDI-TAD; and wherein the DABCO-Br is prepared through the following steps:

dissolving each of triethylenediamine (TEDA) and $Br_2$ in a fifth organic solvent to obtain a triethylenediamine solution and a $Br_2$ solution, mixing the triethylenediamine solution and the $Br_2$ solution in the protective gas atmosphere, stirring a third resulting mixed solution at the room temperature to allow a fifth reaction for 1 h to 3 h, and conducting a third filtration, a second wash, and a drying to obtain the DABCO-Br.

9. A reversible stress-responsive material prepared by the method according to claim 1.

10. The method of preparing the reversible stress-responsive material according to claim 3, wherein a molar ratio of the linear polymer raw material to the indolyl structural unit is 20:(0.5-2) and a molar ratio of the indolyl side chain-containing linear polymer to the MDI-TAD is (0.5-2):(0.1-1).

11. The reversible stress-responsive material according to claim 9, wherein during a preparation of the reversible stress-responsive material, the NPI is synthesized through the following steps:

co-dissolving 2-phenylindole and N-methylolacrylamide in a third organic solvent at a molar ratio of 1:(1-1.5), adding aluminum chloride under stirring, and allowing a third reaction in an ice bath for 2 h; raising to a room temperature, and further allowing the third reaction at the room temperature for 45 h to 50 h; adding dilute sulfuric acid, and conducting an extraction with dichloromethane (DCM); and collecting a resulting organic phase, and conducting a concentration and a purification, wherein a molar ratio of the aluminum chloride to the 2-phenylindole is 1:10; and a molar ratio of the dilute sulfuric acid to the aluminum chloride is 3:2.

12. The reversible stress-responsive material according to claim 9, wherein during a preparation of the reversible stress-responsive material, the NIAM is synthesized through the following steps:

co-dissolving indole and N-methylolacrylamide in a third organic solvent at a molar ratio of adding aluminum chloride under stirring, and allowing a third reaction at 25° C. to 30° C. for 2 d to 3 d; and adding dilute sulfuric acid, and conducting a suction filtration and a purification, wherein a molar ratio of the aluminum chloride to the indole is 3:5; and a molar ratio of the dilute sulfuric acid to the aluminum chloride is 3:2.

13. The reversible stress-responsive material according to claim 11, wherein during the preparation of the reversible stress-responsive material, a molar ratio of the linear polymer raw material to the indolyl structural unit is 20:(0.5-2); and a molar ratio of the indolyl side chain-containing linear polymer to the MDI-TAD is (0.5-2):(0.1-1).

14. The reversible stress-responsive material according to claim 13, wherein during the preparation of the reversible stress-responsive material, the linear polymer raw material is PMA, the indolyl structural unit is NPI, the PMA and the NPI are in a molar ratio of 20:1, and the indolyl side chain-containing linear polymer and the MDI-TAD are in a molar ratio of 1:0.5; or, the linear polymer raw material is PMA, the indolyl structural unit is NIAM, the PMA and the NIAM are in a molar ratio of 20:1, and the indolyl side chain-containing linear polymer and the MDI-TAD are in a molar ratio of 1:0.5; or, the linear polymer raw material is PMA, the indolyl structural unit is a mixture of NPI and NIAM, the PMA, the NPI, and the NIAM are in a molar ratio of 20:0.5:0.5, and the indolyl side chain-containing linear polymer and the MDI-TAD are in a molar ratio of 0.5:0.5; or, the linear polymer raw material is PMMA, the indolyl structural unit is NPI, the PMMA and the NPI are in a molar ratio of 20:1, and the indolyl side chain-containing linear polymer and the MDI-TAD are in a molar ratio of 1:0.5.

15. The reversible stress-responsive material according to claim 9, wherein during a preparation of the reversible stress-responsive material, a mass of the AIBN is 0.01% to 0.02% of a total mass of the linear polymer raw material and the indolyl structural unit; and a mass of the ABVN is 0.05% to 0.2% of the total mass of the linear polymer raw material and the indolyl structural unit.

16. The reversible stress-responsive material according to claim 9, wherein during a preparation of the reversible stress-responsive material, the first organic solvent in S2 is N,N-dimethylformamide (DMF); and the second organic solvent in S4 is 1,4-dioxane or DMF.

17. The reversible stress-responsive material prepared by the method according to claim 9, wherein during a preparation of the reversible stress-responsive material, the MDI-TAD is prepared through the following steps:

S1: dissolving each of ethyl carbazate and 4,4'-methylenebis(phenyl isocyanate) in a third organic solvent to obtain a ethyl carbazate solution and a 4,4'-methylenebis(phenyl isocyanate) solution, mixing the ethyl carbazate solution and the 4,4'-methylenebis(phenyl isocyanate) solution in a protective gas atmosphere, and stirring a first resulting mixed solution at a room temperature to allow a third reaction for 1 h to 3 h; and heating to 85° C. to 95° C., further stirring to allow the third reaction for 1 h to 3 h, and conducting a first filtration and a first wash to obtain a bifunctional semicarbazide;

S2: dissolving the bifunctional semicarbazide in an alkali liquor, heating to reflux at 90° C. to 120° C. for 1 h to 3 h, and acidifying and filtering to obtain a bifunctional urazole; and S3: co-dissolving the bifunctional urazole and DABCO-Br in a fourth organic solvent, stirring a second resulting mixed solution at the room temperature to allow a fourth reaction for 1 h to 3 h, and conducting a second filtration and a vacuum concentration to obtain the MDI-TAD; and wherein the DABCO-Br is prepared through the following steps:

dissolving each of triethylenediamine (TEDA) and $Br_2$ in a fifth organic solvent to obtain a triethylenediamine solution and a $Br_2$ solution, mixing the triethylenediamine solution and the $Br_2$ solution in the protective gas atmosphere, stirring a third resulting mixed solution at the room temperature to allow a fifth reaction for 1 h to 3 h, and conducting a third filtration, a second wash, and a drying to obtain the DABCO-Br.

18. The reversible stress-responsive material according to claim 12, wherein during the preparation of the reversible stress-responsive material, a molar ratio of the linear polymer raw material to the indolyl structural unit is 20:(0.5-2); and a molar ratio of the indolyl side chain-containing linear polymer to the MDI-TAD is (0.5-2):(0.1-1).

19. The reversible stress-responsive material according to claim 18, wherein during the preparation of the reversible stress-responsive material, the linear polymer raw material is PMA, the indolyl structural unit is NPI, the PMA and the NPI are in a molar ratio of 20:1, and the indolyl side chain-containing linear polymer and the MDI-TAD are in a molar ratio of 1:0.5; or, the linear polymer raw material is PMA, the indolyl structural unit is NIAM, the PMA and the NIAM are in a molar ratio of 20:1, and the indolyl side chain-containing linear polymer and the MDI-TAD are in a molar ratio of 1:0.5; or, the linear polymer raw material is PMA, the indolyl structural unit is a mixture of NPI and NIAM, the PMA, the NPI, and the NIAM are in a molar ratio of 20:0.5:0.5, and the indolyl side chain-containing linear polymer and the MDI-TAD are in a molar ratio of 0.5:0.5; or, the linear polymer raw material is PMMA, the indolyl structural unit is NPI, the PMMA and the NPI are in a molar ratio of 20:1, and the indolyl side chain-containing linear polymer and the MDI-TAD are in a molar ratio of 1:0.5.

* * * * *